March 7, 1944.  C. J. BURKLEY  2,343,828
SAFETY TUBE
Filed Jan. 26, 1940
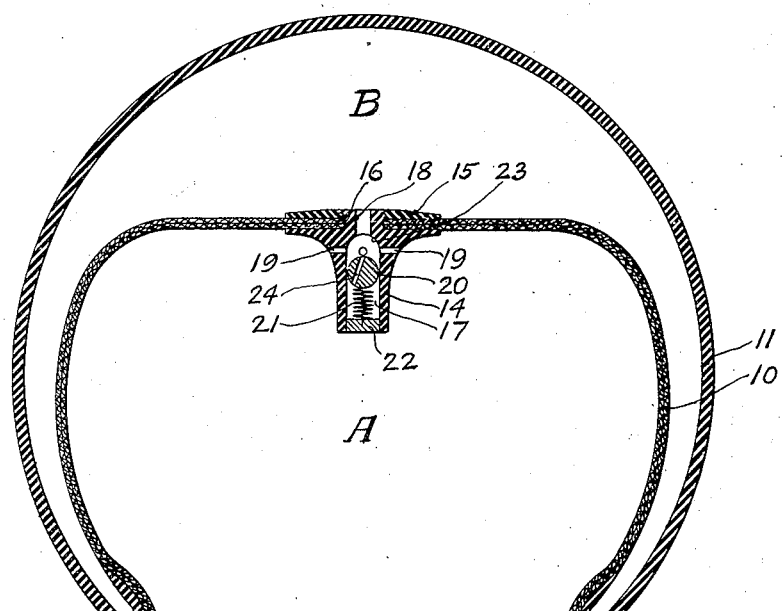
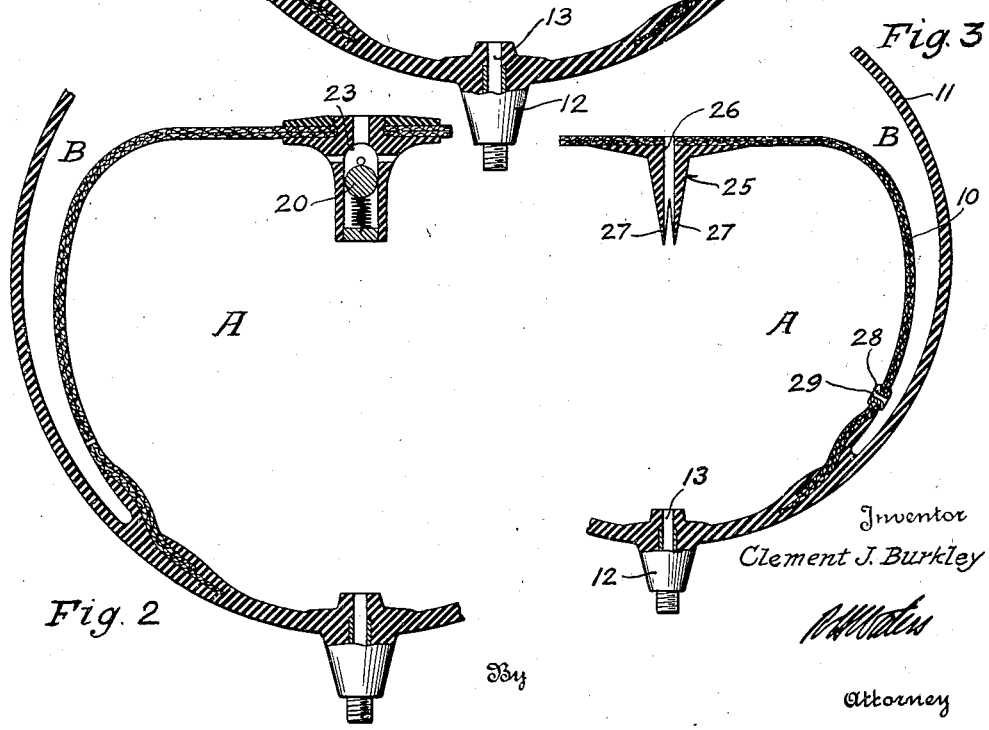
Inventor
Clement J. Burkley
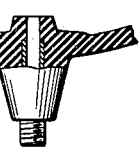
Attorney Patented Mar. 7, 1944

2,343,828

UNITED STATES PATENT OFFICE 2,343,828

SAFETY TUBE

Clement J. Burkley, Akron, Ohio, assignor to Wingfoot Corporation, Akron, Ohio, a corporation of Delaware Application January 26, 1940, Serial No. 315,714

2 Claims. (Cl. 152—342)

The present invention relates to safety tubes and particularly to means for quickly inflating plural-chambered tubes at a rate substantially equal to the rate at which the ordinary single tube can be inflated.

One object of this invention is to provide in a plural-chambered tube a valve through which air is introduced into one of the chambers at the normal rate at which a single-chambered tube can be inflated, and a second valve means between that chamber and an adjacent chamber for permitting the air to pass into the second chamber from the first chamber at a rate substantially equal to the rate at which the air enters the first chamber whereby quick inflation of the plural-chambered tube may be had.

Another object of this invention is to provide in a tube of the character described means for wholly or partially restricting the passage of air between the tubes during normal operation of the tube, whereby in case of failure of one chamber the air will be wholly retained within the other chamber or will leak out of that chamber at a relatively slow rate of speed.

Another object of this invention is to provide in a plural-chambered tube a valve mechanism allowing free and substantially unrestricted flow of air between chambers of a plural-chambered tube when the tube is at rest, but which closes completely upon failure of one of the chambers, and a passage separate from the valve mechanism through which air has a restricted flow and which remains open at all times whereby upon failure of the one chamber the air may leak slowly out of the other chamber to gradually deflate the tube as in the patent to Lee, 2,173,065.

Other objects of this invention will appear hereinafter as the description hereof proceeds, the novel features, arrangements and combinations being clearly set forth in the specification and the claims thereunto appended.

In the drawing,

Fig. 1 is a transverse cross-section of an annular safety tube embodying my invention;

Fig. 2 is a similar view showing a modification of the device shown in Fig. 1; and Fig. 3 shows a further modification of my invention.

In Fig. 1 of the drawing I have illustrated a tube of the type shown in the aforesaid Lee patent in which there is an inner carcass or tube 10 made substantially inextensible longitudinally, preferably by using plied-up cord fabric. 11 indicates the rubber outer portion of the tube which is expansible so that, on inflation thereof, it can expand and fill the casing in which said safety tube is inserted.

The valve 12 which is of any desired or standard construction, is merely diagrammatically illustrated in the drawing and is provided with a bore 13 which permits substantially unrestricted flow of air into the inner chamber A. The wall 10 of the inner chamber is provided preferably at its outer periphery with a valve comprising a valve body 14 of rubber, metal or other material secured in any desired manner to the wall 10 and here illustrated as being held by means of a screw-threaded collar 15 threaded on the valve body 14 at 16. The valve body has a bore 17 with a reduced portion 18 through which the air enters the chamber B from the chamber A. Lateral passages 19 permit the air to pass into the bore 17 and through the reduced portion 18 into the chamber B. A ball valve 20 is normally held retracted as in Fig. 1 by spring 21 attached at one end to the ball 20 and at the other end to means such as the plug 22 in the end of the valve body 14. The passages 19 may be one or more in number and the sum total of their cross-sectional areas should be substantially equal to the opening 13 in the valve 12 so that the air entering chamber A may freely pass outwardly into chamber B, it being understood also that the cross-section of the reduced portion 18 of the bore 17 is substantially equal to or greater than that of the opening 13 in valve 12.

With this construction, when the tube is at rest, an air chuck can be attached to the valve 12 and air will flow freely into the chambers A and B to inflate the tube at substantially the same rate as with an ordinary single tube. When the tube is in normal operation, as when rotating during movement of a vehicle along the road, centrifugal force will act on the ball 20 and throw it outwardly against the action of the spring 21 until it rests on the seats 23 in the bore 17. If the ball valve is imperforate, as in Fig. 2, in which similar reference characters refer to the similar parts in Fig. 1, there would be no communication between the chambers A and B and in case of a failure of the wall 11 of the chamber B the air would be confined within the chamber A and the vehicle could be driven to a place where the tube and possibly the tire could be repaired or replaced.

However, if the operator drives the vehicle for too long a period with the outer chamber deflated there is a chance that the inner chamber will be destroyed or its usefulness greatly impaired and therefore it is preferred that the ball valve 20 be provided with an opening 24 which, when the ball valve is seated, will communicate at one end with the reduced portion 18 of the valve and at its other end with the main portion of the bore 17 and consequently with the passages 19. With such a construction, upon failure of the wall 11 the air will slowly filter through the openings 19, 24 and 18 and gradually deflate the chamber A. The opening 24 is of relatively small size, approximately not over .05 inch in diameter and will be determined upon the rapidity with which it is desired to deflate the chamber A. Thus, it will be seen that I have provided means whereby the tube may be inflated substantially at the same rate as an ordinary single-chambered inner tube and yet have provided means whereby the passage of the air from chamber A to chamber B is restricted wholly or in part upon failure of the wall of the chamber B.

In Figure 3 I have shown a still further modification of my invention in which the same reference characters apply to similar parts illustrated in Figs. 1 and 2. In this form of the invention, however, I have provided a rubber flutter valve 25 having a bore 26 substantially equal to the opening 13 in the valve 12. The inner end of the flutter valve 25 is provided with relatively thin lip portions 27. During normal inflation of the tube the rate of flow of air into the chamber A and into passage 26 is not sufficient to close the lips 27 and therefore the air will flow freely into the chamber B for quick inflation of the tube. However in case the outer tube fails the sudden flow of air from chamber A to chamber B causes the lips 27 to close to prevent the passage of air into the outer chamber B from the inner chamber A, thus giving the same results as with the form of the invention shown in Fig. 2 when the ball valve 20 seats on the seat 23. However it is preferable that instead of cutting off all communication between chamber A and chamber B, the air be permitted to slowly filter out of chamber A upon failure of the wall of chamber B, and for this purpose I have provided a small grommet 28 having a relatively small opening 29 of about the same size as that specified for the opening 24 in the ball valve 20. The grommet 28 is made of metal so that the size of the opening 29 will be definitely determined at all times and there will be no accidental closing of the opening therethrough, nor will there be any enlargement thereof as might occur if it were made of expansible material or if formed merely by puncturing the wall 10 of the inner chamber.

With reference to the form of the invention shown in Fig. 1, instead of making an opening 24 in the ball valve 20, the same result can be achieved by having the seat 23 provided with a small groove in the face thereof whereby when the ball valve seats it will seat imperfectly and will permit the slow filtration of air out of chamber A. Also in this figure a grommet such as 28 shown in Fig. 3 may be used with an imperforate ball valve 20 so that upon closing of the valve the air may leak through the grommet.

Obviously various changes in the particular construction and arrangement of the parts shown in the accompanying drawing can be made without departing from the spirit of the invention or the scope of the appended claims, and therefore I do not wish to be limited except as may hereinafter be set forth in the appended claims.

Having thus fully described my invention, what I claim and desire to secure by Letters Patent of the United States is:

1. An inflatable annular tube having a plurality of chambers formed by at least one transverse wall, means through which air may be initially supplied to one of said chambers, air-control means for controlling the flow of air between said chambers during use of said tube on a vehicle wheel comprising a valve body mounted on said wall, said body having a bore extending therethrough and being reduced at one end thereof to a cross-section sufficient for free passage of the air from said first chamber to an adjacent chamber, a ball valve in said bore having a restricted passage therethrough, said bore extending in a direction somewhat radially of the axis of said tube with the reduced portion at the outermost end, whereby said ball valve will move outwardly under the action of centrifugal force toward said reduced end during rotation of said tube in operation to overlie the reduced end of said bore, and means normally urging said ball valve toward the opposite end of said bore, said passage being arranged in said ball valve to communicate with said bore on opposite sides of said ball valve for restricted flow of air between said chambers in case of failure of one of said chambers.

2. An inflatable annular tube having a plurality of chambers formed by at least one substantially inextensible transverse wall, air-control means for controlling the flow of air between said chambers during use of said tube on a vehicle wheel comprising a valve body mounted on said wall, said body having a bore extending therethrough and being reduced at one end thereof, a ball valve in said bore, said bore extending in a direction somewhat radially of the axis of said tube with the reduced portion at the outermost end, whereby said valve will move outwardly under the action of centrifugal force toward said reduced end during rotation of said tube in operation to overlie the reduced end of said bore, and yielding means strong enough to normally urge said ball valve toward the opposite end of said bore to keep said bore open during normal inflation and deflation but weak enough to permit said ball valve to close the reduced end of said bore under the action of centrifugal force while the tube is rotating in use, said ball valve having a restricted by-pass for permitting only slow filtration of air from one chamber to the other when said ball valve is at the outer-most position in said bore.

CLEMENT J. BURKLEY.